United States Patent
Lewit et al.

[11] Patent Number: 6,004,492
[45] Date of Patent: Dec. 21, 1999

[54] METHOD OF MAKING COMPOSITE SPRING AND DAMPER UNITS

[75] Inventors: Scott M. Lewit, Indialantic; Miles Mackaness, Merritt Island; Ronnal P. Reichard, Melbourne Village, all of Fla.

[73] Assignee: Compsys, Inc., Melbourne, Fla.

[21] Appl. No.: 09/006,798

[22] Filed: Jan. 14, 1998

Related U.S. Application Data

[63] Continuation-in-part of application No. 08/651,621, May 21, 1996, Pat. No. 5,800,749, which is a continuation of application No. 08/345,899, Nov. 28, 1994, abandoned, which is a continuation-in-part of application No. 08/181,321, Jan. 14, 1994, Pat. No. 5,429,066.

[51] Int. Cl.$^6$ .............................. B29C 44/06; B29C 44/12
[52] U.S. Cl. ..................... 264/46.4; 156/182; 264/46.6; 264/257; 264/258; 264/273
[58] Field of Search ........................ 156/182; 264/46.4, 264/46.6, 257, 258, 273

[56] References Cited

U.S. PATENT DOCUMENTS

| | | |
|---|---|---|
| 2,648,619 | 8/1953 | Alderfer . |
| 2,866,730 | 12/1958 | Potchen et al. . |
| 3,435,470 | 4/1969 | Krenzler . |
| 3,567,565 | 3/1971 | Jones et al. . |
| 3,607,600 | 9/1971 | Schreter et al. . |
| 3,835,720 | 9/1974 | Fisher et al. . |
| 3,840,926 | 10/1974 | Stoberl . |
| 3,848,284 | 11/1974 | Livingston . |
| 3,873,654 | 3/1975 | Smith . |
| 3,923,293 | 12/1975 | Wiegand .................. 267/94 |
| 3,989,781 | 11/1976 | Chant . |
| 4,065,150 | 12/1977 | Van Auken . |
| 4,065,820 | 1/1978 | Starratt, Jr. . |
| 4,099,280 | 7/1978 | Hoppe et al. . |
| 4,205,408 | 6/1980 | Glass et al. . |
| 4,263,247 | 4/1981 | Berger et al. . |
| 4,268,571 | 5/1981 | McCarthy . |
| 4,323,406 | 4/1982 | Morello . |
| 4,372,900 | 2/1983 | Doerfling . |
| 4,471,020 | 9/1984 | McCarthy . |
| 4,510,020 | 4/1985 | Samovich . |
| 4,511,523 | 4/1985 | Hsu . |
| 4,568,603 | 2/1986 | Oldham . |
| 4,681,798 | 7/1987 | Gill et al. . |
| 4,695,501 | 9/1987 | Robinson . |
| 4,764,238 | 8/1988 | Dastin et al. . |
| 4,800,114 | 1/1989 | Cichanowski . |
| 4,801,496 | 1/1989 | Buchacher . |
| 4,812,194 | 3/1989 | Pelz . |
| 4,851,283 | 7/1989 | Holtrop et al. . |
| 4,867,826 | 9/1989 | Wayte . |
| 4,877,476 | 10/1989 | Wolf . |
| 4,891,176 | 1/1990 | Drysdale et al. . |
| 4,942,075 | 7/1990 | Hartel et al. . |
| 4,954,377 | 9/1990 | Fischer et al. . |
| 4,988,469 | 1/1991 | Reavely et al. . |
| 4,995,675 | 2/1991 | Tsai . |
| 5,068,001 | 11/1991 | Haussling . |
| 5,087,491 | 2/1992 | Barrett . |
| 5,098,346 | 3/1992 | Redmond . |

(List continued on next page.)

*Primary Examiner*—Allan R. Kuhns
*Attorney, Agent, or Firm*—Quarles & Brady LLP

[57] ABSTRACT

A composite spring-damper and method of making same. The spring-damper has an exposed fabric layer free of structural foam and curable resin. A core formed of resilient foam defines a spring shape and a fabric layer disposed on an outer surface of the core is attached to foam core by means of the foam having substantially filled only interstices of an inner portion of the fabric layer, without substantially penetrating an outer portion of said fabric layer; whereby the fabric layer of the composite spring-damper may thereafter be substantially completely saturated with a curable material for lamination to another structure. An attached reinforcing fabric layer may be provided on the exterior surface of the fabric layer, in which case the fabric layer may be entirely saturated and only the attached fabric layer substantially free of foam.

16 Claims, 9 Drawing Sheets

U.S. PATENT DOCUMENTS

| | | |
|---|---|---|
| 5,173,227 | 12/1992 | Ewen et al. . |
| 5,227,227 | 7/1993 | Boulanger . |
| 5,230,844 | 7/1993 | Macaire et al. . |
| 5,250,132 | 10/1993 | Lapp et al. . |
| 5,258,585 | 11/1993 | Juriga . |
| 5,304,339 | 4/1994 | Le Comte . |
| 5,308,675 | 5/1994 | Crane et al. . |
| 5,364,061 | 11/1994 | Ciolczyk et al. . |
| 5,413,661 | 5/1995 | Spengler et al. . |
| 5,446,250 | 8/1995 | Oka . |
| 5,487,854 | 1/1996 | Leoni ................ 264/46.4 |

METHOD OF MAKING COMPOSITE SPRING AND DAMPER UNITS

CROSS REFERENCE TO RELATED APPLICATION

This application is a continuation-in-part of application Ser. No. 08/651,621, filed May 21, 1996, now U.S. Pat. No. 5,800,749. Application Ser. No. 08/651,621 is a continuation of application Ser. No. 08/345,899, filed Nov. 28, 1994, now abandoned. Application Ser. No. 08/345,899 is a continuation-in-part of application Ser. No. 08/181,321, filed Jan. 14, 1994, now U.S. Pat. No. 5,429,066.

BACKGROUND OF THE INVENTION

1. Field of the Invention

This invention relates to a composite structure and method of making composite structures. More particularly, the invention relates to composite structures which are especially adapted for use as spring and damper units in a variety of applications.

2. Description of Related Art

In the past, a number of structural composite articles have been developed using a variety of different technologies. One prior art technique involves interweaving yarns of polyester fibers with yarns of glass fibers to form a composite fabric. The fabric is then fitted within a mold and soaked with resin. The formed fabric and resin composition is then allowed to harden within the mold. While providing a generally rigid structure, such a technique includes a number of limitations, among them the inability to produce a variety of different shapes of substantial bulk or complex dimensions.

Another prior art technique involves manufacturing a light weight energy-absorbing structure made up of a laminate including a plurality of fabrics. The fabrics are pre-impregnated with a thermosetting resin and abutted against a core of cellular foam which has had a bonding material applied at the interface between the impregnated fabric and the foam. Heat is applied to cure the resin and the bonding material. However, when bonding material is used, it is often the case in hostile environments that the bonding material breaks down, an undesirable result when such structures are used in high load or stress applications.

Yet still another prior art technique involves the manufacture of a thermo-formable composite article comprised of a core layer made of a synthetic resin foam. A pair of adhesive layers are placed in contact with the opposite upper and lower surfaces of the core layer and a pair of fabric layers are superimposed on the opposite upper and lower surfaces of the core layer. The fabric layers are bonded to the core layer by the adhesive layers. At least one of the fabric layers is made of a non-woven fabric which has been impregnated with a thermoplastic or thermosetting resin. This technique also involves the disadvantages noted above with respect to the use of adhesives.

In boat building, especially glass fiber boats, hulls are typically reinforced by a grid arrangement of structural members known as "stringers" and "bulkheads," hereafter collectively referred to as "stringers." Present boat-building technology typically employs plywood stringers, although a growing percentage uses glass fiber/foam stringers. The plywood stringer system involves several process stages. The plywood is first cut to shape by a cutter or by hand with the use of templates. The stringer system which is commonly made up of interlocking stringers and bulkheads is assembled outside of the boat, with interlocking pieces being held with staples. Once the system is assembled, it is then placed in a boat as a module and laminated into place using a combination of reinforcing fabrics.

Glass fiber stringers are installed in a slightly different manner from plywood stringers. One way of installing such stringers is to cut blocks of foam into the shape of the stringers. The stringer shaped foam is then bonded into the hull and covered with glass fiber. Another way is that the glass fiber shell of the stringer is first laminated using a male mold. The stringer is then ground to fit into the boat and once the stringer has been ground to fit, it is spaced off of the bottom of the boat to avoid cracking problems. The stringer is then laminated into place and holes are drilled into the stringer and the stringer is filled with a two-part urethane foam.

Future boat construction is expected to use closed molding technologies. The reason for this is 1) to control noxious vapor emissions into the environment, 2) to reduce labor costs and (3) to create structurally superior constructions. Such future technology will generally require use of stringer systems made of composite structures compatible with such closed moldings. Conventional stringer systems are not well suited to such technologies since they will need to be installed after the hull has been laminated using an open mold. Wood stringers would be difficult to incorporate into a closed mold due to height and width constraints. Further, prepositioning of glass fiber reinforcement normally hand laminated over the wood or foam stringer system would be costly and create quality control problems. Conventional glass fiber stringers also pose problems due to the void in the stringer structures. Specifically, since foam is injected into such stringer after installation, it becomes difficult to keep the resin from filling the inside of the stringer.

Another problem which arises in fabrication of composite structures is the difficulty in constructing a composite member which provides shock absorbing characteristics and resiliency. Such components can be used in varied applications such as shock isolation members between a boat hull liner or deck and the outer hull, engine mounting systems, leaf springs and in any other type of composite structure which requires an engineered resiliency and/or shock absorption. In the past, these characteristics have been provided using shock absorbing rubber mounts, conventional metal or plastic spring and hydraulic shock absorbers. However, such systems have proven unsuitable for use in certain composite structures for a variety of reasons. In some instances, environmental conditions dictate that conventional spring and damping systems not be used due to the corrosive effect of salt water for example. Further, the point of attachment between a composite structure and a non-composite spring/damping system will typically result in a high localized stress concentration which can tend to damage to the composite structure.

In accordance with the invention, these and other problems with the prior art are avoided by providing a composite structure and method of making such structure which avoids the use of adhesive and lends itself to a variety of shapes, structures and applications. In one specific aspect, the composite articles manufactured in accordance with the method are used as spring and damper systems for composite constructions.

SUMMARY OF THE INVENTION

The invention concerns a method of making a composite spring-damper having an exposed reinforcing fabric layer free of structural foam and curable resin.

The method comprises the steps of: attaching a reinforcing fabric layer to a non-woven fabric layer on one side thereof; arranging the attached fabric layers in a configuration constrained against outward movement and with the non-woven fabric layer facing inwardly and defining a spring shaped cavity between opposing surfaces thereof; dispensing a predetermined amount of a self-expanding, self-curable, uncured resilient structural foam into the cavity, the foam expanding and curing in the cavity at a molding pressure determined by the predetermined amount of the foam and thereby attaching itself to the non-woven fabric layer to form the composite structure, the molding pressure causing the expanding foam to substantially fill only interstices of the non-woven fabric layer, without substantially penetrating the reinforcing fabric layer; and, freeing the cured composite structure from the constraint of the arranging step. The reinforcing fabric layer of the composite structure is thereafter substantially completely saturatable with a curable material for lamination to another structure in a subsequent processing step. The method can further comprise the step of laminating the cured composite spring damper to a larger composite structure by saturating the reinforcing fabric layer of the cured composite structure with a curable resin.

The spring shape can be any suitable profile designed for resilient flexing such as an arc (leaf spring), a helix (coil spring), an S profile, a U shaped profile or an oval or circular profile. The resilient structural foam used in the invention preferably has a pre-determined energy absorbing characteristic in order to achieve a desired degree of damping. The non-woven fabric used in the invention can be composed of continuous thermoplastic fiber needle, punched together as a felt-like fiber layer in the configuration constrained against outward movement and defining the spring-shaped cavity. Alternatively, the non-woven fabric layer can be selected from one of: a polyester staple mat; a glass fiber mat; a organic fiber mat; and, an inorganic fiber mat.

According to the method a predetermined amount of a two-part, self-expanding, self-curing urethane foam is preferably utilized as the resilient foam core. The method can also comprise the step of experimentally determining an amount of the dispensed foam to be sufficient to cause the foam to penetrate into interstices of the fabric layer as the foam expands and cures, without penetrating into the outer portion of the fabric layer.

The resulting composite spring-damper formed according to the invention has an exposed reinforcing fabric layer free of structural foam and curable resin, a core formed of resilient foam and defining a spring shape; a reinforcing fabric layer attached to a non-woven fabric layer on one side thereof, the attached fabric layers disposed on an outer surface of the core, the foam attached to the non-woven fabric layer by means of having substantially filled only interstices of the non-woven fabric layer, without substantially penetrating the reinforcing fabric layer The composite spring-damper foam is advantageously selected from one of the group consisting of an open cell urethane or polyurethane foam, PVC, EPS, phenolic, foam rubber, or any one of a variety of other flexible foams which are self expanding as part of the curing process. One example of such a foam is a two part product available from BASF Corporation comprised of BASF Product Code designations NB8009-7-132 (resin part) and WUC3164T (isocyanate part). The foam has a energy absorbing characteristic or damping rate of between about $0.1\zeta$ and $0.5\zeta$. As used herein, "$\zeta$" is the ratio of the actual damping coefficient divided by the critical damping coefficient and is therefore non-dimensional. "$\zeta$" is equal to one when a spring—damper combination will oscillate only once before coming to rest. The energy absorbing characteristic of the foam is selected to achieve the desired spring damping rate. The resilient foam is preferably a two part-part, self expanding, self curing urethane foam. However, other foam may also be used as will be readily appreciated by those skilled in the art. In any case, the damping rate is controlled by foam selection or by varying the density of a particular foam which is used. Different types of foams tend to have different damping characteristics. However, for any given foam type, damping is generally increased with increased foam density.

In an alternative embodiment, the method for making a composite spring-damper a single non-woven fabric layer as described above, is used instead of the attached fabric layers. In this embodiment, the foam substantially penetrates only an inner portion of the fabric layer, without substantially penetrating an outer portion of the fabric layer. Thus, the outer portion of the fabric can also be subsequently saturated with resin.

DETAILED DESCRIPTION OF THE PREFERRED EMBODIMENTS

Figure 1:
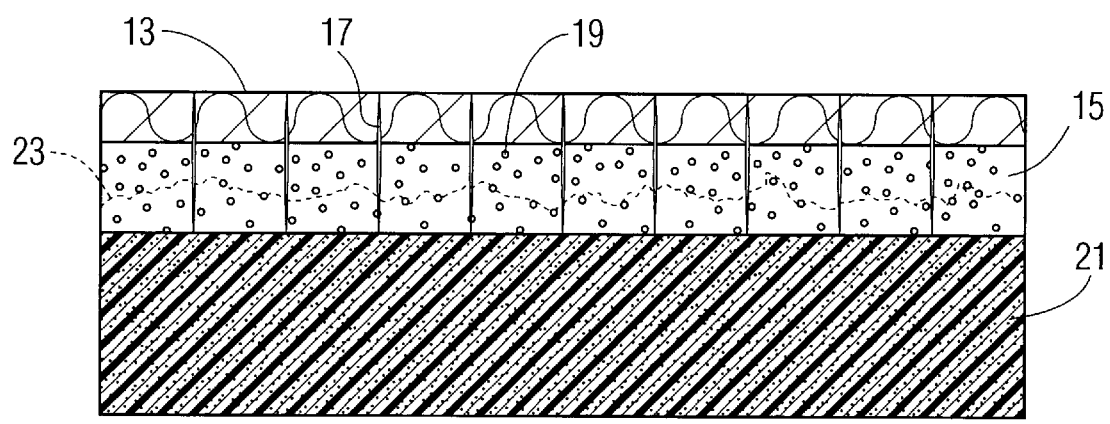
FIG. 1 is a partial, side cross-sectional view of a composite structure in accordance with the invention.

FIG. 1 illustrates a typical construction for a composite structure 11 in accordance with the invention. The structure 11 is made up of a reinforcing fiber layer 13, preferably a directional reinforcing fiber layer of organic or inorganic structural reinforcing fibers such as glass fiber, carbon fibers, aramid fibers such as is available under the name Kevlar, linear polyethylene or polypropylene fibers such as is available under the name Spectra, or polyester fibers. By reinforcing fiber is meant a fiber which when added to a composite material enhances the structural properties of the material. The fibers can be randomly oriented, or preferentially, they can be oriented in one or more directions. While a number of specific types of materials have been given for use as the reinforcing fiber layer, it will be appreciated by those of ordinary skill in the art that other equivalent-type reinforcing fiber layers can be employed in the practice of the invention.

The fiber layer 13 is attached to a fabric layer 15 which has a large number of interstices or pores 19. The fabric layer 15 is preferably a non-woven fabric composed of continuous thermoplastic fiber, needle punched together to yield a felt like fabric. One example of such a fabric is Trevira Spunbond, which is commercially available from Hoechst Celanese Corporation. However, the invention is not limited in this regard and the fabric layer 15 may be comprised of other materials, including polyester staple mat and glass fiber mat, as well as other organic and inorganic fiber mats and fabrics.

Preferably, the reinforcing fiber layer 13 and fabric layer 15 are secured to each other mechanically. Such mechanical attachment is typically done by conventional stitching 17. Other means of attachment, as noted previously, include alternatives such as needle punching, stapling or buttons. In the case of certain non-hostile environment applications even adhesives can be used.

A structural foam 21 is attached to the fabric layer 15 by having penetrated into the interstices 19 at penetration region 23 of the foam 21 during the manufacture of the structure 11. Preferably the foam is a self-expanding, self-curing urethane foam which has been caused to expand at region 23 into the interstices 19 of fabric layer 15 by having been filled into a mold in an amount sufficient to cause pressure as a result of expansion of the foam 21 to penetrate at region 23 into the interstices 19 of the fabric layer 15.

The interaction between the foam 21 and fabric layer 15 provides a number of mechanical advantages over other structures. More specifically, the low density urethane foams used in the practice of the invention typically have tensile strengths of about 50 pounds per square inch (psi) with an elongation of under 7%. When such a foam is expanded into a non-woven fabric, the mechanical properties of the fabric/foam system increases significantly. In the case where the fabric used is a continuous filament needle punched thermoplastic polyester fabric such as Trevira Spunbond, the mechanical properties of the Trevira/foam system increases to around 2,000 to 3,000 psi, with an elongation of over 20%. All of these non-woven fibers are typically non-woven organic or inorganic fiber mat, for example, polyester, fabrics of conventional construction.

Figure 2:
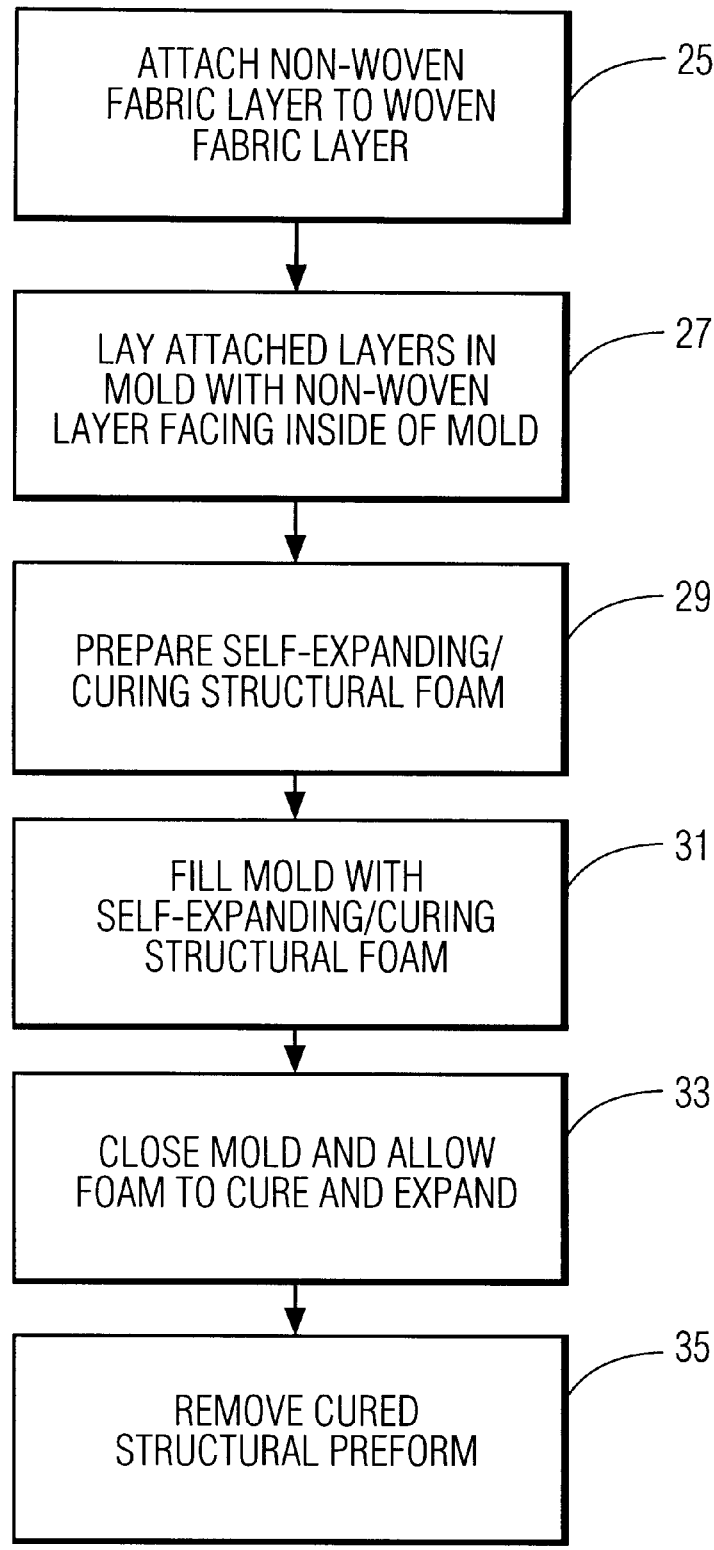
FIG. 2 is a block diagram showing the sequence of steps of making the composite structure in accordance with the method of the invention.

The method of making the composite structure in accordance with the invention is illustrated in FIG. 2. In a first step 25 the fabric layer 15 is attached to the reinforcing fabric layer 13. Preferably such attachment is done by stitching. Alternatively, as noted previously, the fabrics can be secured to each other by means of needle punching, staples or buttons or other mechanical technologies sufficient to secure one fabric to the other. After attaching the two layers of fabrics together, the attached layers are laid in a mold at a step 27 with the layer 15 facing the inside of the mold.

At step 29 a self-expanding, self-curing structural foam is prepared/mixed. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent. The mold is then filled with the self-expanding and self-curing structural foam at step 31 in an amount sufficient to allow for expansion of the foam after the mold is closed. This generates enough pressure so that the foam penetrates into the interstices 19 of the fabric layer 15. On average, enough foam is added to generate pressures of about 5–18 "pounds per square inch" (psi), at a minimum 5 psi, and at an optimum pressure of 10 psi. Different mold pressure may be used, however, and upper pressure limits are dictated primarily by mold strength. For a given mold pressure, foam amounts and thickness of the non-woven layer can be adjusted so that mold completely fills with the foam, but the foam does not penetrate through the reinforcing layer. The mold is closed at step 33 and the foam is allowed to cure and expand therein. At step 35 the formed article is then removed after curing.

Figure 6:
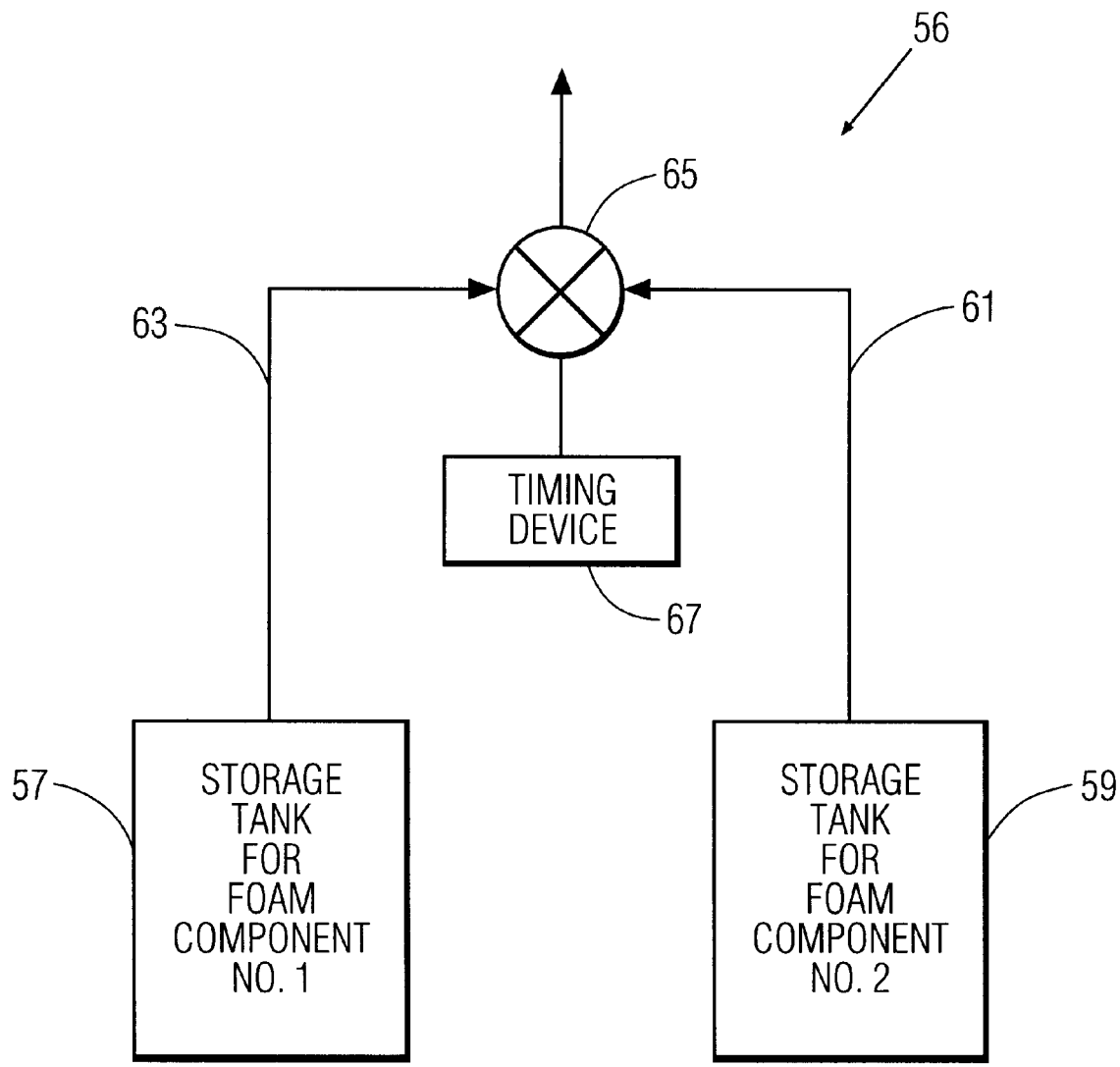
FIG. 6 is a block diagram showing a pressurized foam injection system having a time variable dispensing control system.
Figure 7:
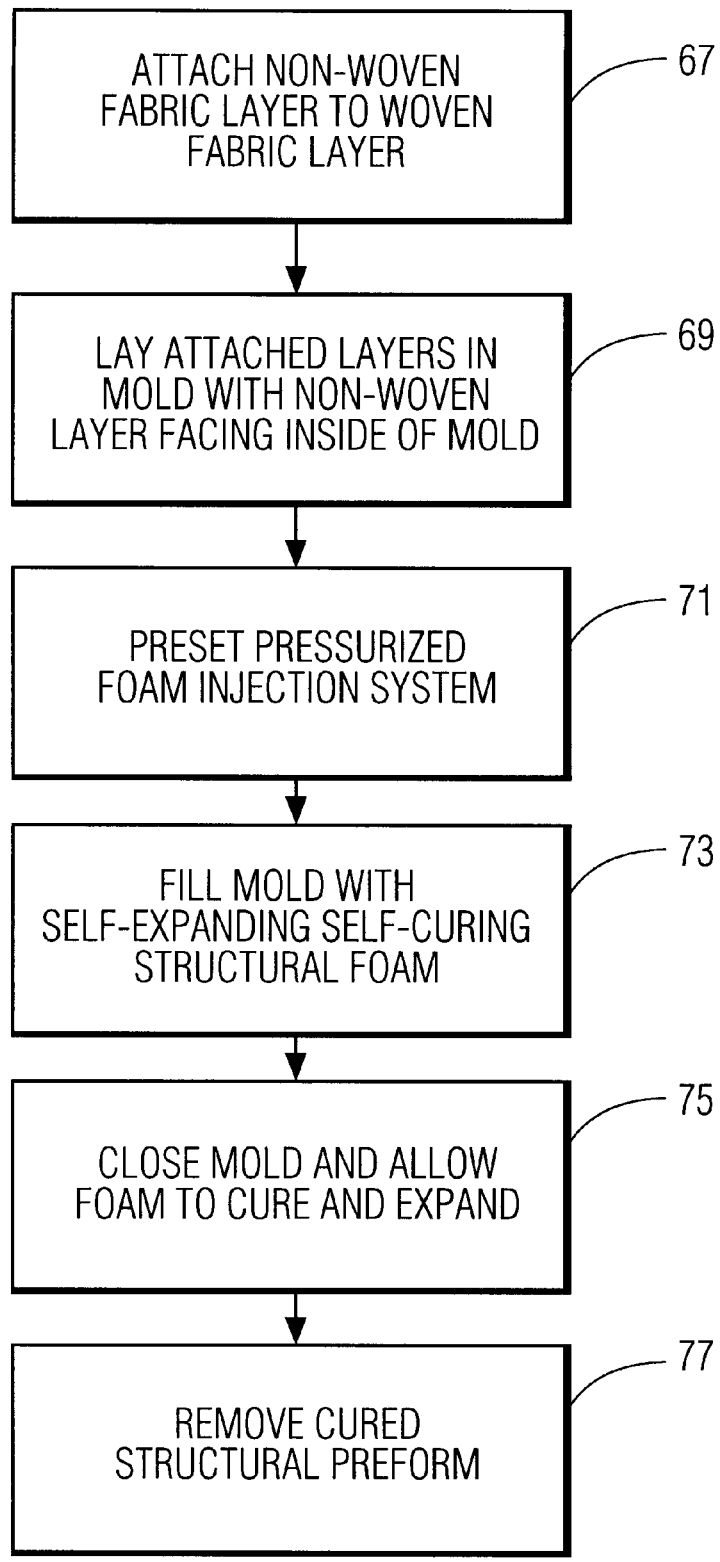
FIG. 7 is a block diagram showing a sequence of steps of making the composite structure in accordance with an alternative method of the invention.
Figure 8:
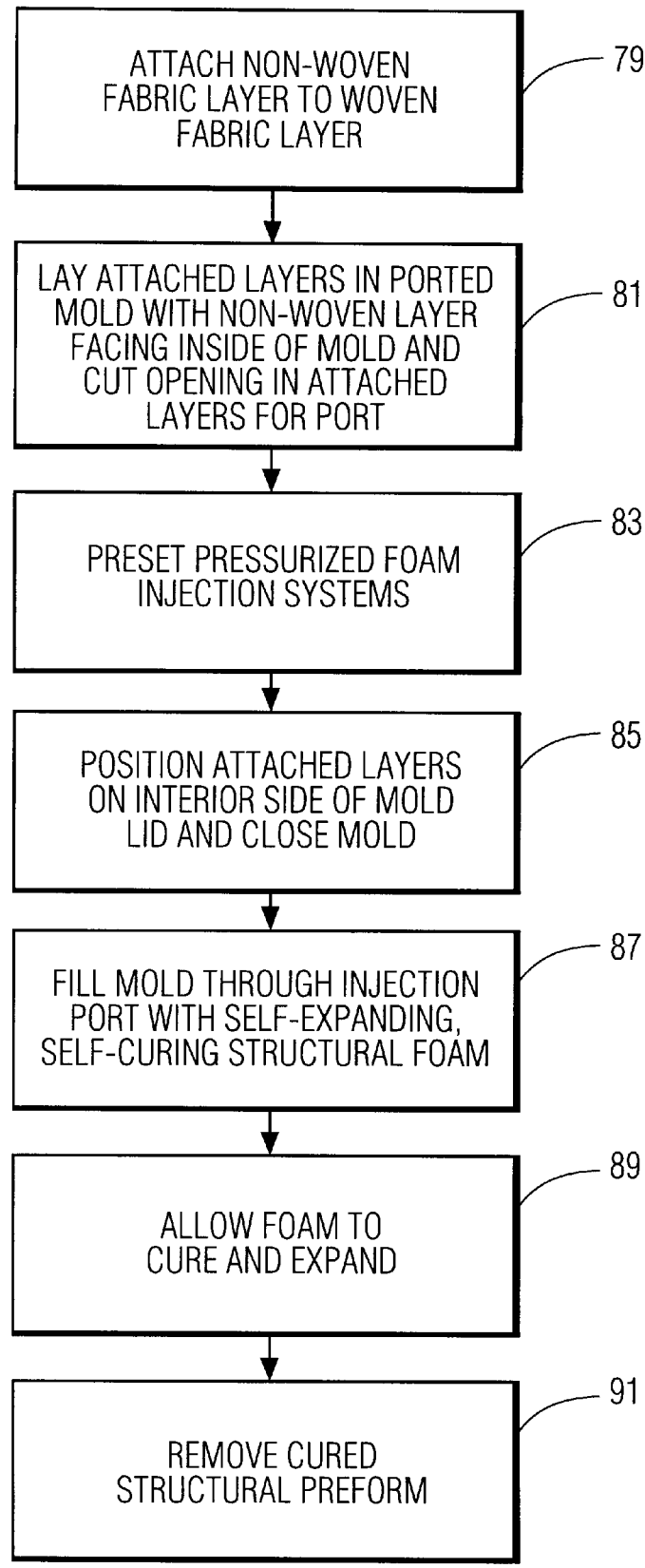
FIG. 8 is a block diagram showing a sequence of steps of making the composite structure in accordance with a second alternative method of the invention.

FIG. 6 shows a foam dispensing system for a two-part, self-expanding, self-curing foam which can be utilized for an alternative method according to the present invention as shown in FIGS. 7 and 8. The foam-dispensing system 56 includes storage tanks 57, 59 for separately storing the constituent materials which comprise the self-expanding, self-curing foam. The constituent foam materials are forced under pressure through hoses 61, 63 to nozzle 65. Nozzle 65 is provided for mixing the constituent materials necessary to form the self-expanding, self-curing foam, and dispensing said foam in a controlled manner. Nozzle 65 includes one or more valves to control dispensing of foam, which valves may be controlled by a timing device 67. Timing device 67 may be pre-set to cause the valves associated with nozzle 65 to open for a pre-determined duration, and thereby dispense a precisely-determined mass of self-expanding, self-curing foam.

An alternative method of making the composite structure in accordance with the present invention is illustrated in FIG. 7. In a first step 67, the fabric layer 15 is attached to the reinforcing fabric layer 13, as previously described. After attaching the two layers of fabric together, the attached layers are laid in a mold at a step 69 with the fabric layer 15 facing the inside of the mold.

At step 71, the foam-dispensing system is prepared to dispense self-expanding, self-curing structural foam. In this step, timing device 67 is preset to open the valves in nozzle 65 for a predetermined dispensing time, so that the foam-dispensing system releases a predetermined mass of foam upon command. At step 73, the foam-dispensing system is caused to fill the mold with self-expanding, self-curing structural foam. If the timing device for the foam-dispensing system has been preset, the mold will be filled with a precise amount of foam corresponding to the dispensing time set on the timing device 67 in step 71. At step 75, the mold is closed and the foam allowed to cure and expand. Finally, at step 77, the formed article is removed after curing.

A second alternative method of making the composite structure in accordance with the invention is illustrated in FIG. 8. Steps 79, 81 and 83 in FIG. 8 are identical to steps 67, 69 and 71, respectively, in FIG. 7, except that the mold is provided with a foam injection port to allow foam into the interior of the mold. The foam injection port may be comprised of any suitable opening formed in a wall of the mold or a mechanical fitting capable of allowing the passage of foam into the mold. If the injection port is comprised of a simple opening, it is preferably located on an upper area of the mold, such as the mold lid, to prevent foam from escaping as the mold is filled. An opening is cut in the attached layers where they cover the injection port to allow the passage of foam through the attached layers.

At step 85, rather than filling an open mold with self-expanding foam, the attached fabric layers are positioned on the mold lid, so that the woven fabric layer faces the lid, and the non-woven layer faces inside of the mold when the lid is closed. After the lid has been closed in step 85, the foam-dispensing system is activated in step 87 so that self-expanding, self-curing structural foam is dispensed into the mold through the injection port. If the timing device for the foam-dispensing system has been pre-set, the mold will be filled with a precise amount of foam corresponding to the dispensing time set on the timing device 67. At step 89, the foam is allowed to cure and expand. Finally, at step 91, the cured structural pre-form is removed from the mold.

With regard to the method of FIGS. 7 and 8, the precise mass of foam dispensed into the mold and the pre-set dispensing time set on the timing device for controlling said volume, are preferably determined experimentally to achieve penetration of said foam into the non-woven layer, but not into the woven layer of the attached fabric layers. The mold structure must be designed to withstand the pressure generated by the expanding foam. Typically, foam pressure may range from 5 to 18 psi.

In the method according to FIGS. 2, 7 and 8, one or more overflow ports can be provided on a portion of the mold to release excess foam, and limit foam pressure within the mold to a range of between 5 to 18 psi. The overflow port is preferably located on an upper area of the mold such as the mold lid. This placement prevents foam from escaping when the mold is initially filled, and permits foam to escape only after it has begun to expand. The overflow port can be comprised of a simple opening cut in a wall of the mold. Alternatively, a suitable fitting may be used which passes through a mold wall, and allows excess foam to escape the interior of the mold. If such overflow ports are used, a hole is cut in the attached fabric layers where they pass over the overflow port to allow the foam to escape the interior of the mold as it expands under pressure. In the method according to FIG. 8, the foam injection port can also serve as an overflow port. The size and number of the overflow ports are preferably determined experimentally to ensure that when excess foam has been added to a mold, the foam does not penetrate through the reinforced fabric layer.

The articles manufactured in accordance with the method of the invention can be molded in a variety of different shapes and applied in a number of different technologies. One specific application for the articles is in the boat building industry wherein the articles can be shaped as stringers to replace conventional wood stringers or glass fiber stringers used in the manufacture of glass fiber boats. The use of stringers in accordance with the practice of the invention results in a modular approach to boat manufacturing that saves the boat builder time and money, particularly for small boats. More specifically, conventional stringer systems take approximately six man hours to install. Stringers manufactured in accordance with the method of the invention require approximately twenty to forty man minutes to install on a cured hull. If the stringer system of the invention is installed and wet out with resin while the hull laminate resin is still "wet," i.e., uncured, molding time can also be significantly reduced. Thus, the process reduction results in substantial cost savings and decreased mold cycle times.

The stringers in accordance with the structure of the invention are especially adapted for use in boat construction. Typically, open-molded boat construction begins with a gel coat being first sprayed into a mold. Once the gel coat has cured, a skin coat consisting of chopped strand mat or chopped roving, woven roving or stitch bonded glass fiber is laid on the cured gel coat layer. This will result in the structural layer of the boat. Typically, such a layer is then impregnated with a resin and allowed to cure to form the structural layer, and the stringers are laid therein after curing.

Figure 3:
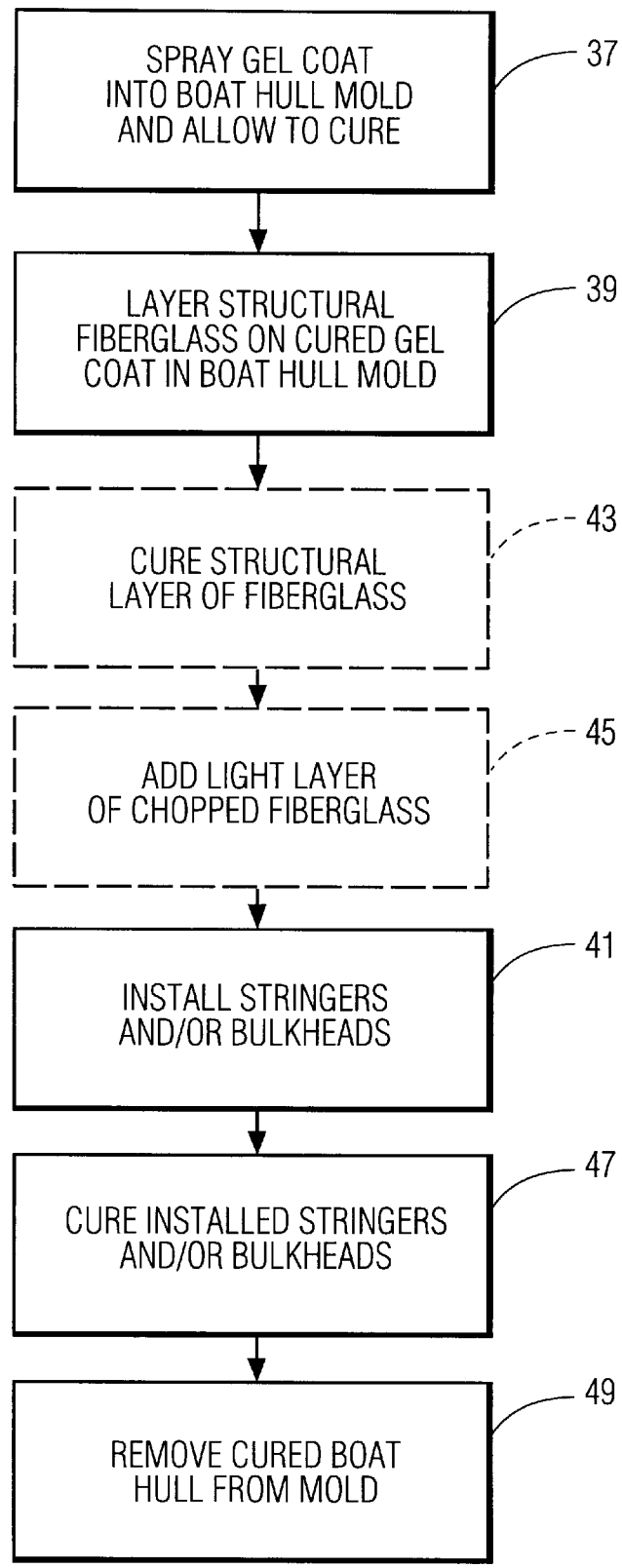
FIG. 3 is a block diagram showing a sequence of steps illustrating the method of manufacturing boats using the composite structure in accordance with the invention as stringers for the hull of the boat.

In accordance with the method of the invention as illustrated in FIG. 3, the gel coat is first sprayed at step 37 into a boat-hull mold and allowed to cure. The structural glass fiber is layered at step 39 in the same manner as in conventional boat construction. In a preferred aspect, the stringers are then installed at step 41, preferably with the layer of structural glass fiber having been impregnated and the stringers having been impregnated with a setting resin. At step 47 the installed stringers are then cured along with the structural layer, and at step 49 the boat hull is then removed from the mold.

In an alternative implementation, the structural glass fiber is initially cured at a step 43 and thereafter at step 45 a light layer of chopped glass fiber is added at the locations where the stringers are to be installed. In this alternative, the light layer of chopped glass fiber is impregnated with resin and the stringers are impregnated with resin and then installed. The entire system is then allowed to cure. The process follows thereafter the same as with the initially described process with reference to FIG. 3.

Figure 4:
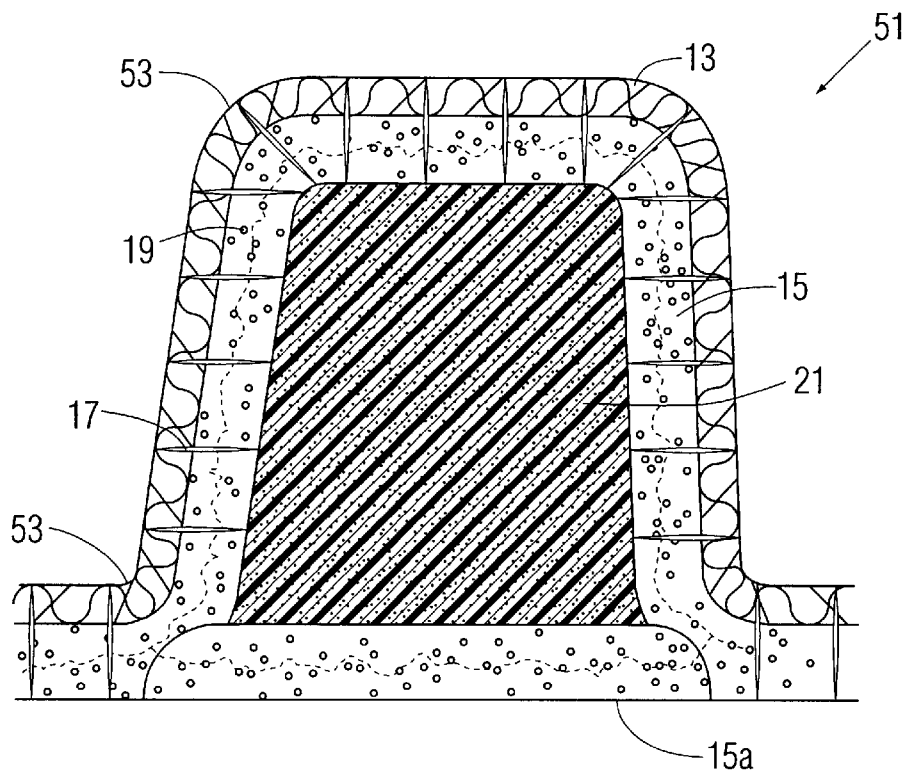
FIG. 4 is an end, cross-sectional view of a typical stringer construction made according to the method of the invention.

A number of advantages result in construction in accordance with the above-described system. First, as illustrated in FIG. 4, it will be appreciated that a stringer 51 in accordance with the structure of the invention can be made with rounded corners 53 which results in reduced stress on the cured glass woven fiber 13 as implemented in use in boat construction because resin impregnated cured glass fiber generally weakens at sharp corners. The appropriate shape of a mold in making the structure 11 of the invention can avoid such sharp corners. Optionally, to provide increased strength and toughness to the urethane foam 21, an additional layer 15a of non-woven fabric can be attached to the lid of the mold to ensure that the fabric becomes secured to the foam at a region wherein the reinforcing fabric 13, i.e., glass fiber, is not required. As noted previously, the use of the fabric layer interfaced with the foam 21 provides increased structural properties.

Figure 5:
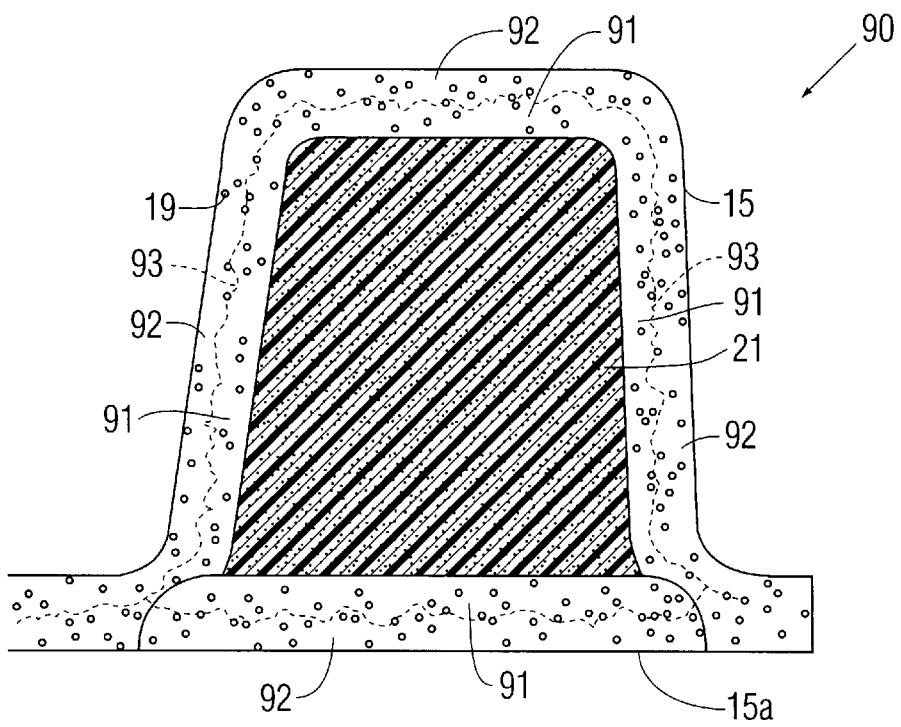
FIG. 5 is an end, cross-sectional view of an alternative embodiment to the stringer shown in FIG. 4, which omits the reinforcing fabric layer.

A lower strength, alternative embodiment of a composite structure 90 is shown in FIG. 5, wherein only the fabric layer 15 is utilized, without the reinforcing layer 13, as in the bottom of the stringer shown in FIG. 4. In this embodiment, and in accordance with an inventive arrangement, a predetermined amount of a self-expanding, self-curable, uncured structural foam is dispensed into the cavity 21. The foam expands and cures in the cavity at a molding pressure determined by the predetermined amount of the foam and thereby attaches itself to the fabric layer to form the composite structure. The molding pressure causes the expanding foam to substantially fill only interstices 19 of an inner portion 91 of the fabric layer, without substantially penetrating an outer portion 92 of the fabric layer. An illustrative border between the inner and outer portions is represented by a jagged dashed line 93. After freeing the cured composite structure from the constraint of the arranging step, the outer portion 92 of the fabric layer of the composite structure is substantially completely saturable with a curable material for lamination to another structure in a subsequent processing step. Such other structure may include, for example, spas, baths, Jacuzzis, shower enclosures and the like. The composite structure in accordance with this inventive arrangement is especially adapted for use in lower stress environments than such composite structure technology has generally been applied to in the past. Significantly, however, it can be adapted for use in applications requiring higher strength. For example, if the composite structure is used as a structural reinforcing component, additional layers of reinforcing fabric may be laminated over the basic composite structure to enhance its strength.

Figure 9A:
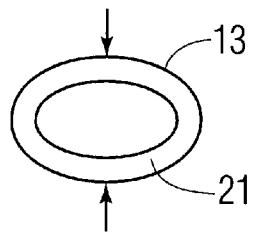
FIGS. 9(A)–(G) are cross-sectional views of a variety of spring shapes that may be used in conjunction with the invention.
Figure 9B:
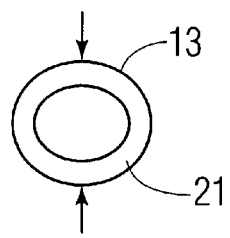
Figure 9C:
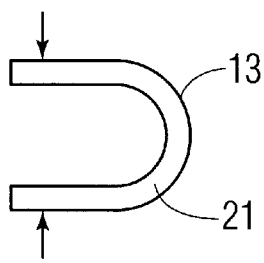
Figure 9D:
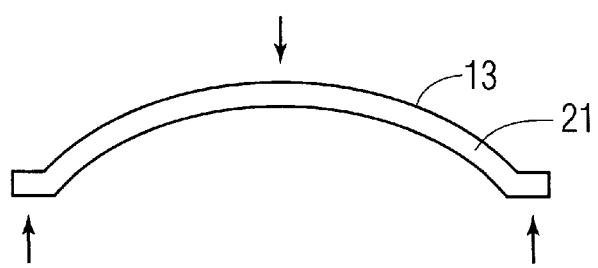
Figure 9E:
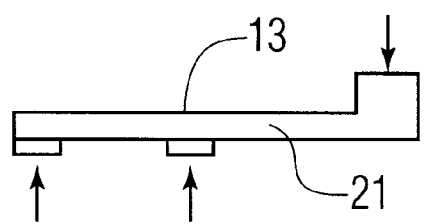
Figure 9F:
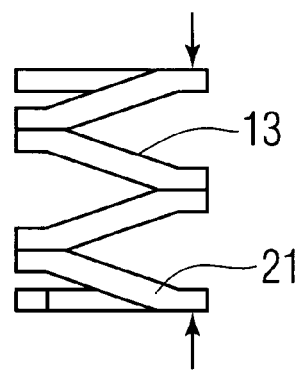
Figure 9G:
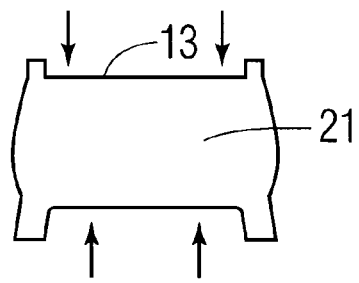

In an alternative embodiment according to the invention, a resilient foam may be substituted for a rigid foam in the stringers. If the component thus formed is provided with a spring shape or profile as shown in FIG. 9, a composite spring-damper can be provided. As shown in FIGS. 9(A)–(D), the composite spring can be formed in an oval, circular, U-shaped, or leaf spring cross-section. Alternatively a cantilever or coil shape may be used as shown in FIGS. 9(E)–(F). Finally, a box member may also be used a shown in FIG. 9(G) with resilient side walls. The arrows in FIG. 9 represent the direction of force applied to each of the springs. It should be understood that the examples shown in FIG. 9 are not exhaustive but are merely representative of the many different shapes which can be used to form a spring. Accordingly, the invention is not limited to the embodiments shown but can include any structure which is configured for resilient behavior when a force is applied thereto.

In a preferred embodiment according to the invention, the composite spring-damper thus formed is subsequently saturated with curable resin and is allowed to cure. During this process, the part may be either laminated in place by concurrently saturating an attachment point to which the spring-damper is to be joined, or the part may be saturated and cured independently. In any event, the resulting composite spring-damper has a hard fiber reinforced cured resin exterior which, as a result of its spring shape, will offer resiliency when a force is applied thereto as shown in FIG. 9. Significantly, however, the internal core of the part will be comprised of a resilient foam having energy absorbing characteristics which may be selected to achieve a specific damping rate needed for a particular spring-damper application.

In a preferred embodiment, the resilient foam used for the spring-damper application is preferably selected from one of the group of foams consisting of In an alternative embodiment, resilient stringer components may be manufactured in accordance with the invention. In this embodiment, the injected foam is chosen to have flexible and resilient characteristics when cured. Such foams include a flexible or open cell urethane foam, foam rubber, or any one of a variety of other flexible foams which are self expanding as part of the curing process. One example of such a foam is a two part product available from BASF Corporation comprised of BASF Product Code designations NB8009-7-132 (resin part) and WUC3164T (isocyanate part). However the invention is not limited in this regard and it will be appreciated that any other material may also be used, provided that it can be injected into a cavity, subsequently expand so as to penetrate the non-woven fiber layer and change state to a resilient material.

Foams may be obtained with varying damping characteristics, in the range of between about $0.1\zeta$ and $0.5\zeta$. As used herein, "$\zeta$" is the ratio of the actual damping coefficient divided by the critical damping coefficient and is therefore non-dimensional. "$\zeta$" is equal to one when a spring—damper combination will oscillate only once before coming to rest. The type and density of the resilient foam is preferably selected to achieve the desired spring damping rate. Different types of foams tend to have different damping characteristics and a particular damping rate can be selected in part by choosing a particular type of foam known to have a desired damping characteristic. However, for any given foam type, damping is generally increased with increased foam density. Accordingly, damping can also be controlled by varying foam density.

Spring coefficients can be varied by altering the shape of the composite spring-damper, varying the thickness of the cured resin/fiber layer, or by varying the stiffness of the reinforcing fibers, thereby providing a higher modulus of elasticity. Likewise, damping characteristics may also be varied by altering the cross-sectional thickness of the resilient foam forming the core of the spring-damper part. As the cross-sectional thickness of the foam core is increased, the damping rate will also increase.

Finally, it should be noted that the cross-sectional profiles shown in FIG. 9 are most conveniently fabricated using a continuous extrusion process, rather than individually molding each part. In particular, resilient foam is preferably injected into a suitable die which defines the desired spring shape. Reinforcing fabric and/or non-woven fabric as described herein may be dispensed from rolls and guided to the interior surfaces forming the die to form the outer layer of the foam core. The continuously extruded composite spring-dampers may then be cut to desired lengths for a particular application as may be required. Such continuous extrusion processes are conventional and can be implemented by means of various well known arrangements as will be appreciated by those skilled in the art.

While the invention has been described with reference to its use as stringers or bulkheads for boats, it will be appreciated by those of ordinary skill in the art that other uses can be made of the composite structures in accordance with the invention. For example, such structures can be used as reinforcing elements for automobile body parts such as hood and trunk lids, bumper beams and structural framing. Likewise, another use can be in architectural applications where the structures could be integrated into panel fabrication processes as structural ribs or stiffeners.

Although particular preferred embodiments of the invention have been disclosed in detail for illustrative purposes, it will be recognized that variations or modifications of the disclosed invention, including the use of additional layers of fabric, alternative types of self-expanding foam, and various alternative adhesive or synthetic resins, lie within the scope of the present invention.

What is claimed is:

1. A method of making a composite spring-damper having an exposed reinforcing fabric layer free of structural foam and curable resin, said method comprising the steps of:

attaching a reinforcing fabric layer to a non-woven fabric layer on one side thereof;

arranging said attached fabric layers in a configuration constrained against outward movement and with the non-woven fabric layer facing inwardly and defining a spring shaped cavity between opposing surfaces thereof;

dispensing a predetermined amount of a self-expanding, self-curable, uncured resilient structural foam into said cavity, said foam expanding and curing in said cavity at a molding pressure determined by said predetermined amount of said foam and thereby attaching itself to said non-woven fabric layer to form said composite structure, said molding pressure causing said expanding foam to substantially fill only interstices of said non-woven fabric layer, without substantially penetrating the reinforcing fabric layer; and, freeing said cured composite structure from said constraint of said arranging step, said reinforcing fabric layer of said composite structure being thereafter substantially completely saturatable with a curable material for lamination to another structure in a subsequent processing step.

2. The method of claim 1, further comprising the step of laminating said cured composite spring damper to a larger composite structure by saturating said reinforcing fabric layer of said cured composite structure with a curable resin.

3. The method according to claim 1 wherein said spring shape is selected from one of the group consisting of an arc, a helix, an S or a circle.

4. The method according to claim 1 further comprising the step of selecting said resilient structural foam to have a pre-determined energy absorbing characteristic in order to achieve a desired degree of damping.

5. The method of claim 1, comprising the step of arranging said non-woven fabric composed of continuous thermoplastic fiber, needle punched together as a felt-like fiber layer in said configuration constrained against outward movement and defining said spring-shaped cavity.

6. The method of claim 1, comprising the step of selecting said non-woven fabric layer from one of: a polyester staple mat; a glass fiber mat; a organic fiber mat; and, an inorganic fiber mat.

7. The method of claim 1, comprising the step of dispensing a predetermined amount of a two-part, self-expanding, self-curing urethane foam.

8. The method of claim 1, comprising the step of experimentally determining an amount of said dispensed foam to be sufficient to cause said foam to penetrate into interstices of said fabric layer as said foam expands and cures, without penetrating into said outer portion of said fabric layer.

9. A method for making a composite spring-damper comprising the steps of:

arranging a fabric layer in a configuration constrained against outward movement and defining a spring-shaped cavity between opposing surfaces of said fabric layer;

dispensing a predetermined amount of a self-expanding, self-curable, uncured resilient structural foam into said cavity, said foam expanding and curing in said cavity at a molding pressure determined by said predetermined amount of said foam and thereby attaching itself to said fabric layer to form said composite structure, said molding pressure causing said expanding foam to substantially fill only interstices of an inner portion of said fabric layer, without substantially penetrating an outer portion of said fabric layer; and, freeing said cured resilient composite structure from said constraint of said arranging step, said outer portion of said fabric layer of said composite structure being thereafter substantially completely saturable with a curable material for lamination to another structure in a subsequent processing step.

10. The method of claim 9, further comprising the step of laminating said cured composite structure to another composite structure by saturating said outer portion of said fabric layer of said cured composite structure with a curable resin.

11. The method according to claim 9 wherein said spring shape is selected from one of the group consisting of an arc, a helix, an S or a circle.

12. The method according to claim 9 further comprising the step of selecting said resilient structural foam to have a pre-determined energy absorbing characteristic in order to achieve a desired degree of damping.

13. The method of claim 9, comprising the step of arranging a non-woven fabric composed of continuous thermoplastic fiber, needle punched together as a felt-like fiber layer in said configuration constrained against outward movement and defining said spring-shaped cavity.

14. The method of claim 9, comprising the step of selecting said fabric layer from one of: a polyester staple mat; a glass fiber mat; a organic fiber mat; and, an inorganic fiber mat.

15. The method of claim 9, comprising the step of dispensing a predetermined amount of a two-part, self-expanding, self-curing urethane foam.

16. The method of claim 9, comprising the step of experimentally determining an amount of said dispensed foam to be sufficient to cause said foam to penetrate into interstices of said inner portion of said fabric layer as said foam expands and cures, without penetrating into said outer portion of said fabric layer.

\* \* \* \* \*